United States Patent
Chang et al.

(10) Patent No.: US 8,086,982 B2
(45) Date of Patent: Dec. 27, 2011

(54) METHODS AND SYSTEMS FOR REDUCING CLOCK SKEW IN A GATED CLOCK TREE

(75) Inventors: Chia-Ming Chang, Kaohsiung (TW); Shih-Hsu Huang, Taichung (TW); Yuan-Kai Ho, Taipei (TW); Jia-Zong Lin, Taoyuan (TW); Hsin-Po Wang, Hsinchu (TW); Yu-Sheng Lu, Hsinchu (TW)

(73) Assignee: Springsoft USA, Inc., San Jose, CA (US)

( * ) Notice: Subject to any disclaimer, the term of this patent is extended or adjusted under 35 U.S.C. 154(b) by 412 days.

(21) Appl. No.: 12/397,654

(22) Filed: Mar. 4, 2009

(65) Prior Publication Data

US 2010/0225353 A1   Sep. 9, 2010

(51) Int. Cl.
  *G06F 17/50*   (2006.01)
(52) U.S. Cl. ................ 716/114; 716/113; 716/108
(58) Field of Classification Search ............ 716/108, 716/113, 114
  See application file for complete search history.

(56) References Cited

U.S. PATENT DOCUMENTS

| | | | | |
|---|---|---|---|---|
| 5,798,935 A | * | 8/1998 | Doreswamy et al. | 716/114 |
| 5,864,487 A | * | 1/1999 | Merryman et al. | 716/108 |
| 5,923,188 A | * | 7/1999 | Kametani et al. | 326/93 |
| 6,440,780 B1 | * | 8/2002 | Kimura et al. | 438/129 |
| 6,701,506 B1 | * | 3/2004 | Srinivasan et al. | 716/114 |
| 7,003,741 B2 | * | 2/2006 | Srinivasan | 716/113 |
| 7,346,873 B2 | * | 3/2008 | Mandry | 716/114 |
| 2001/0029599 A1 | * | 10/2001 | Minami et al. | 716/6 |
| 2009/0228844 A1 | * | 9/2009 | Mak et al. | 716/2 |

OTHER PUBLICATIONS

Chang; "Type-Matching Clock Tree for Zero Skew Clock Gating"; DAC 2008; Jun. 8-13, 2008; USA; pp. 714-719.*

* cited by examiner

*Primary Examiner* — Naum Levin
(74) *Attorney, Agent, or Firm* — Finnegan, Henderson, Farabow, Garrett & Dunner, L.L.P.

(57) ABSTRACT

Systems and methods for synthesizing a gated clock tree with reduced clock skew are provided. A gated clock tree circuit with reduced clock skew may include a clock source and edge-triggered state elements. A gated clock tree disposed between the clock source and state elements may include a level in which each logic gate has a common logic type. Logic gates in the gated clock tree may also be configured as logic-gate buffers. The logic gates may also be configured as NAND-gated equivalents. The clock signal distributed through the gated clock tree may drive both positive-edge-triggered and negative-edge-triggered state elements.

18 Claims, 8 Drawing Sheets

METHODS AND SYSTEMS FOR REDUCING CLOCK SKEW IN A GATED CLOCK TREE

FIELD OF THE DISCLOSURE

The present disclosure relates generally to improved systems and methods for reducing clock skew in synchronous digital systems. In more detail, the present disclosure pertains to integrated circuit (IC) design and related Electronic Design Automation (EDA) tools that may be used to synthesize a gated clock tree.

BACKGROUND

In synchronous digital systems, a clock signal serves as the time reference around which data is driven in the circuit. Within the circuit, clocked state elements, such as flip-flops, registers, and latches, often store data that correspond to a particular state. As a result, clock signals and other input data to these elements should conform to certain timing requirements to ensure proper function in the circuit.

Clock skew, or differences in the propagation delays of the various paths in a clock tree, represents a significant timing consideration that clock distribution techniques seek to improve. When clock skew is not controlled below tolerable levels, the clock signal arrives at state elements at unmanageably different points in time, causing incorrect state values to become stored in state elements. This may occur, for example, when the clock skew occupies too significant a portion of the clock period. This situation is of particular concern as clock frequencies grow increasingly faster.

A known clock tree design technique attempts to control clock skew by ensuring that logic gates in each level of a tree, such as clock buffers (which are often inserted along a path to maintain sharper clock edges) have the same size. Another design technique equalizes the number of logic gates in all paths from source to state element.

These conventional methods, however, do not address a major source of clock skew caused by different types of logic gates being disposed within the same levels in a clock tree. This source of clock skew is a side-effect of conventional clock distribution techniques, which often involve complex clock trees that include different types of logic gates within the same level. Such techniques include clock buffering (i.e., disposing buffer gates in a clock tree to create sharper clock edges) and clock gating (i.e., disposing logic gates in a clock tree to allow one or more inactive modules in a digital system to be disabled to save power). Because different types of gates generally introduce differing amounts of propagation delay, they may create increased clock skew effects. Consequently, current methods such as matching buffers size and equalizing the number of gates in a path do not adequately control clock skew below tolerable limits.

Accordingly, there remains a need for an improved method of reducing clock skew that addresses the clock skew created by different types of logic gates being disposed within the same level of a clock tree.

SUMMARY OF THE INVENTION

Consistent with aspects of the present invention, systems and methods for providing a type-matched gated clock tree are disclosed. Further consistent with aspects of the present invention, systems and methods for providing a type-matched, load-matched gated clock tree are also disclosed.

According to one aspect, a process for synthesizing a gated clock tree with reduced clock skew may include providing a clock source operable to generate a clock signal. The process may further include providing a plurality of edge-triggered state elements. The process may also include providing a gated clock tree between the clock source and the plurality of edge-triggered state elements, wherein the gated clock tree comprises a level, wherein the level includes a plurality of logic gates. The process may also comprise matching the plurality of logic gates in the level such that each logic gate in the level has a common logic type.

In another aspect, a gated clock tree circuit for reduced clock skew may include a clock source operable to generate a clock signal and a plurality of edge-triggered state elements. The circuit may further include a gated clock tree disposed between the clock source and the plurality of edge-triggered state elements, wherein the gated clock tree comprises a plurality of logic gates, wherein at least one of the plurality of logic gates is configured as one of a logic-gate buffer and a NAND-gate equivalent, such that each logic gate in the level has a common logic type.

According to a further aspect, a computer-readable storage medium comprising instructions that, when executed by a processor, performs a process that may comprise providing a clock source operable to generate a clock signal. The process may further comprise providing a plurality of edge-triggered state elements. The process may also include providing a gated clock tree between the clock source and the plurality of edge-triggered state elements, wherein the gated clock tree comprises a plurality of logic gates. The system may further comprise matching the plurality of logic gates in the level such that each logic gate in the level has a common logic type.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification illustrate several embodiments of the invention and together with the description, serve to explain the principles of the invention.

DESCRIPTION OF THE EMBODIMENTS

The following detailed description refers to the accompanying drawings. Where the same reference numbers are used in the drawings and the following description such reference numbers refer to the same or similar components or processes. While several exemplary versions and aspects of the invention are described herein, modifications, adaptations and other implementations are possible without departing from the spirit and scope of the invention. For example, substitutions, additions and/or modifications may be made to the components illustrated in the drawings, and the exemplary methods described herein may be modified by substituting, reordering, or adding steps to the disclosed methods. Accordingly, the following detailed description does not limit the invention Instead, the proper scope of the invention is defined by the appended claims.

The present description relates to systems and methods for synthesizing a gated clock tree with reduced clock skew. More specifically, the present description relates to systems and methods for providing a type-matched gated clock tree in a synchronous digital system in which each logic gate within a level of the gated clock tree has a common logic type. The disclosed systems and methods may be useful in the design and synthesis of digital circuits and may be implemented in an EDA system or software module used to synthesize circuits (such as gated clock trees) as part of the design and production of semiconductor IC chips.

For the purpose of this specification, "providing" a type-matched gated clock tree may refer to the original, manual or automated, synthesis of a gated clock distribution network or gated clock tree in accordance with embodiments of the present invention. Providing a type-matched clock tree, however, may also refer to methods and systems for converting a pre-existing gated clock tree into a type-matched gated clock tree consistent with embodiments of the present invention.

Figure 1A:
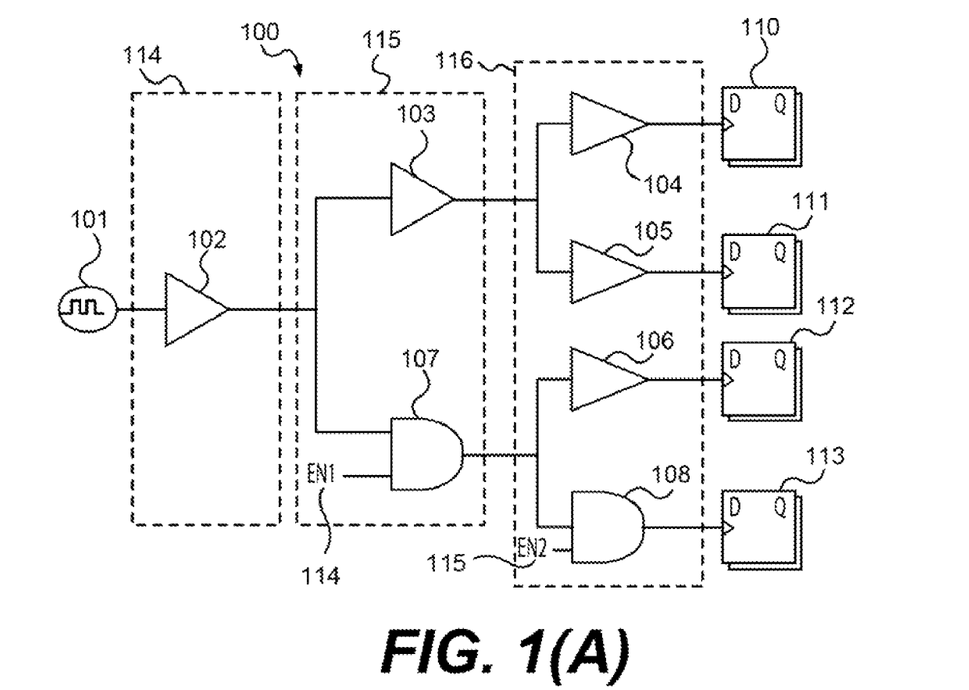
FIG. 1(a) is a diagram of a conventional clock-buffered gated clock tree of the prior art.
Figure 1B:
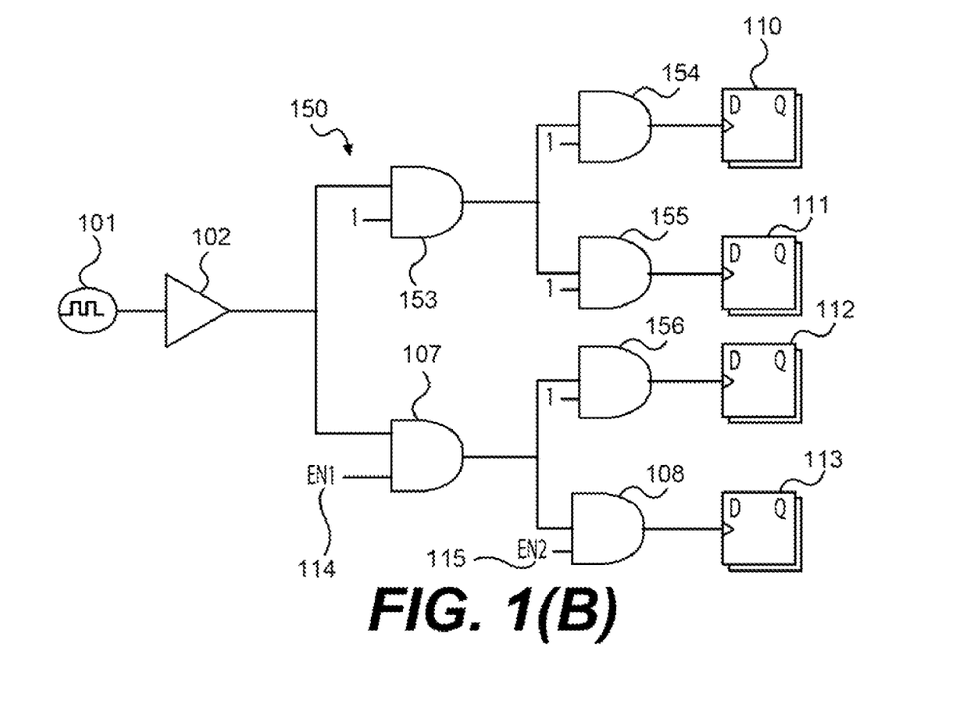
FIG. 1(b) is a diagram of an exemplary type-matched gated clock trees synthesized in accordance with an embodiment of the present invention, including combinational logic equivalent to the unmatched clock tree of FIG. 1(a).

FIGS. 1(a) and 1(b), together, compare a conventional gated clock tree of the prior art with a type-matched gated clock tree consistent with some embodiments of the present invention. FIG. 1(a) depicts a conventional clock-buffered gated clock tree of the prior art. Conventional clock tree 100 contains a clock source 101, which drives four sets of state elements 110-113) which, in this case, each includes a pair of flip-flops. As used herein, a state element may be a latch, flip-flop or another positive or negative edge-triggered circuit element. Conventional clock tree 100 includes three levels and seven logic gates. A "level" describes one stage of a clock tree (clock distribution network), or a set of circuit elements a clock signal passes through as it moves toward the set of state elements. For example, the "top" level 114 of clock tree 100 includes one buffer gate 102. Another level 115 includes buffer gate 103 and AND gate 107. And a third level 116 includes buffers 104-106 and AND gate 108 As described above, clock buffers are often used in conventional gated clock trees in order to maintain sharper clock edges.

Non-buffer type logic gates, such as AND gates 107 and 108) make this type of tree a "gated" clock tree. "Logic gate," as used herein, refers generally to gates that may be used in a clock tree, including buffer-type gates, such as a buffer gate or an inverter gate, or non-buffer type logic gates, such as, for example, an AND, OR, NAND, or XOR gate. Gated clock trees typically employ logic gates in the clock tree to allow certain inactive portions of a digital system to be deactivated in order to save power. In this case, conventional tree 100 specifies three gated clock domains, one corresponding to each of the branches defined by buffer gate 102, AND gate 107, and AND gate 108. These gates may be referred to as "roots" of their respective gated clock domains. According to this combinational logic, flip flops 110 and 111 remain active at all times because the clock signal merely passes through buffer gates 102-105. Flip-flops 112 and 113, however, may be controlled using AND gates 107 and 108. Accordingly, flip-flops 112 are active (i e., receiving the clock signal) when the enable input 120 associated with the AND gate 107 is high or one. Similarly, flip-flops 113 are active only when enable inputs 120 and 125 associated with the AND gates 107 and 108, respectively, are one.

Conventional gated clock tree 100 also includes four clock paths, which are defined by possible routes between the clock source 101 and the flip-flops. Tracking the path at the upper-most branch of clock tree 100, for example, the clock signal begins at clock source 101 and then propagates through buffers 102, 103, and 104 before arriving at the pair of flip-flops 110. In the lower-most path, the clock signal traverses clock buffer 102, AND gate 107, and AND gate 108 before arriving at flip-flops 113.

Conventional gated clock tree 100 may be described as "unmatched" because it includes logic gates in at least one level that do not have a common logic type. Level 115, for example, contains buffer gate 103 and AND gate 107. As a result, conventional tree 100 may suffer increased clock skew. In this case, the difference between the propagation delay along the path including buffer 103 and the path including AND gate 107 may be increased.

Referring now to FIG. 1(b), type-matched clock tree 150 represents an exemplary type-matched gated clock tree synthesized in accordance with the principles of the present invention. In this case, type-matched gated clock tree 150 has been synthesized as a logical equivalent to unmatched tree 100. Unlike the logic gates in conventional gated clock tree 100, however, the logic gates in each level of type-matched tree 150 have a common logic type—in this case the AND type. Type-matched tree 150 therefore provides the same gating and buffering functionality as conventional tree 100 by configuring AND gates 153-156 as logic-gate buffers.

A "logic-gate buffer," as used herein, describes a non-buffer type logic gate that has been configured to function as a conventional buffer gate. Logic-gate buffers may be advantageously used instead of a conventional buffer gate, as necessary, to avoid synthesizing a level in which the logic gates in the level do not have a common type (e.g., a level that includes buffer gates and AND gates). For example, to configure an AND gate to function as a logic-gate buffer gate, one input associated with the AND gate may receive the clock signal and the remaining, non-clock input(s) may be set to high. When configured in this manner, the output of the AND gate will follow the clock signal and thereby mimic the function of a conventional buffer gate. Because logic gates of the same type introduce similar propagation delays, even across varying process corners (differences due to manufacturing inconsistencies), matching the logic gate types in at least one level may reduce clock skew effects, as compared with conventional gated clock trees that have different types of gates in the same level.

Figure 2:
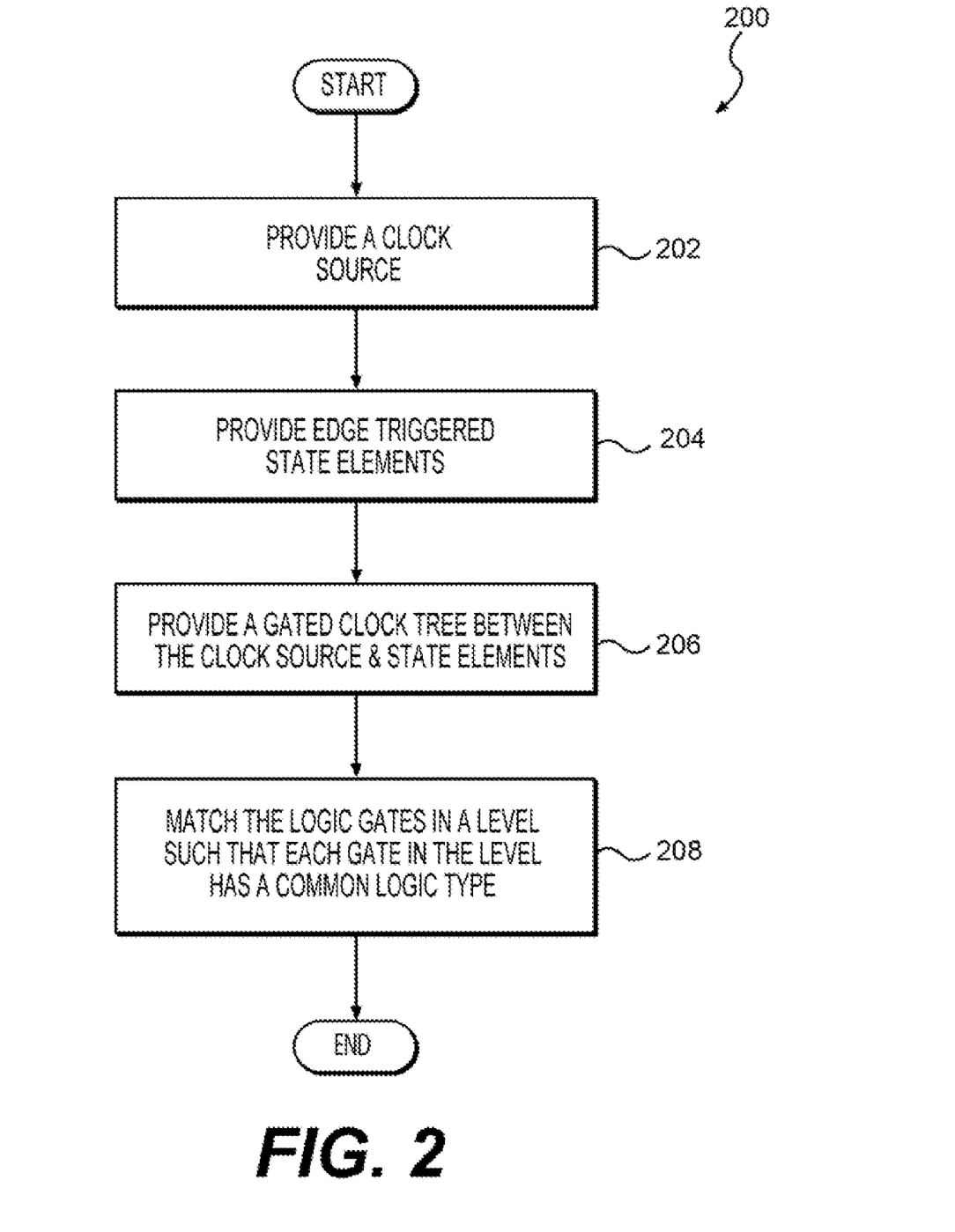
FIG. 2 is a flow diagram of an exemplary process for synthesizing a type-matched gated clock tree in accordance with an embodiment of the present invention.

FIG. 2 illustrates an exemplary computer-implemented process 200 for synthesizing a type-matched gated clock tree in accordance with some embodiments of the present invention. Typically, such a process is implemented as one or more program modules running on a computer, such as processor 1002 of computer system 1000, described in more detail below with reference to FIG. 10. Beginning at step 202, a clock source for generating a clock signal may be provided. Then, at step 204, edge-triggered state elements may be provided. Next, at step 206, a gated clock tree is provided between the clock source and state elements. The gated clock tree provided at step 206 may have multiple levels, each containing one or more logic gates. Then, at step 208 the logic gates in at least one level of the gated clock tree is configured as a logic-gate buffer such that each gate in that level of the tree has a common logic type.

A level of a gated clock tree in which buffer gate(s) and no more than one type of non-buffer logic gate is desired may be synthesized by implementing the buffer gates as logic-gate buffers of the same type as the non-buffer logic gate(s) in the same level. In this scenario, the step of matching the logic gates in the level (step 208), may involve transforming or otherwise converting buffer type logic gates in a level to logic-gate buffers. Referring again to FIGS. 1(a) and 1(b), for example, level 116 in conventional gated clock tree 100 contains only one type of non-buffer logic gates—the AND type of gate 108. As a result, the step of matching the logic gates in the equivalent level 156 in type-matched tree 150 may be performed using AND-type logic gate buffers 154-156 instead of conventional buffers 104-106.

Figure 3:
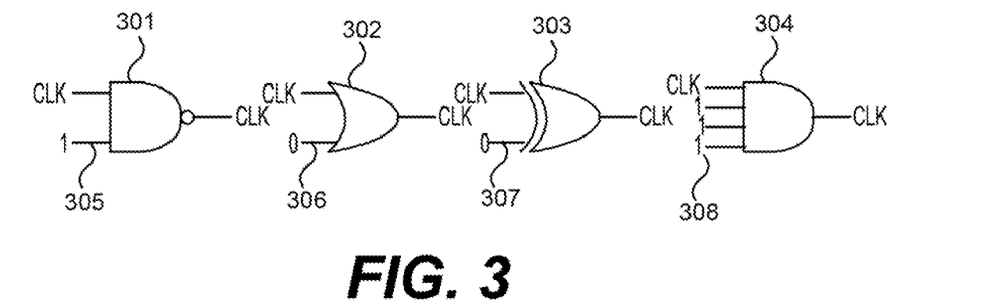
FIG. 3 is an illustration of several exemplary logic gates configured as logic-gate buffers.

Other types of non-buffer logic gate may be similarly configured as logic-gate buffers. For example, FIG. 3 illustrates several other non-buffer logic gates configured to function as logic-gate buffers in accordance with principles of the present invention. As shown, each of the depicted logic gates has been configured to function as a buffer and therefore may be used in a gated clock tree synthesis instead of a conventional buffer, or as otherwise desired without affecting the combinational logic of the gated clock tree. In addition, logic-gate buffers may provide similar features as a conventional buffer, such as maintaining sharper clock edges.

To create a NAND-type logic-gate buffer, for example, the non-clock input(s) 305 may be set to 1 (high). In the case of an OR gate or an XOR gate, non-clock inputs 306 or 307, respectively, may be set to zero. It should be noted that the illustrated logic-gate buffers are merely provided for the purposes of explanation. Those skilled in the art will recognize that other logic gates may be similarly configured to function as logic-gate buffers. Furthermore, though two-input logic are described here, multi-input logic gates may also serve the same purpose. For example, a multi-input AND gate 304 may be configured as a logic-gate buffer by setting all non-clock inputs to 1.

Conversely, a level of a gated clock tree in which more than one type of non-buffer logic gate is desired may not be synthesized by implementing the buffer gates as logic-gate buffers of the same type as the non-buffer logic gate(s) in the same level. In this scenario, the step of matching the logic gates in the level (step 208), may instead involve transforming each gate in the level into its NAND-gate equivalent.

Figure 4A:
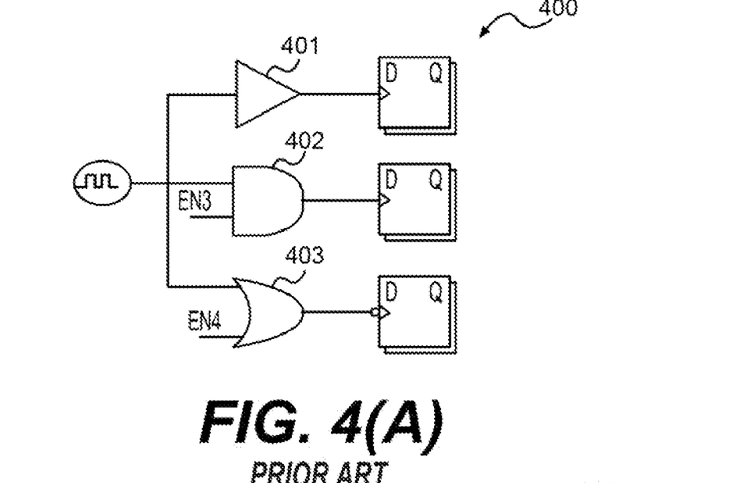
FIG. 4(a) is a diagram of an exemplary conventional gated clock of the prior art in which a level contains more than one different type of non-buffer logic gates.

FIG. 4(a) depicts an example of such a conventional tree 400 that includes a level having more than one type of non-buffer logic gate. As shown, buffer gate 401, AND gate 402, and OR gate 403, are disposed in the same level of tree 400. In addition, AND gate 402 and OR gate 403 represent non-buffer logic gates, each of a different type. Accordingly, implementing buffer gate 401 as a logic-gate buffer of either the OR type or the AND type would not result in matching each of the gates in the level such that they have a common type.

Figure 4B:
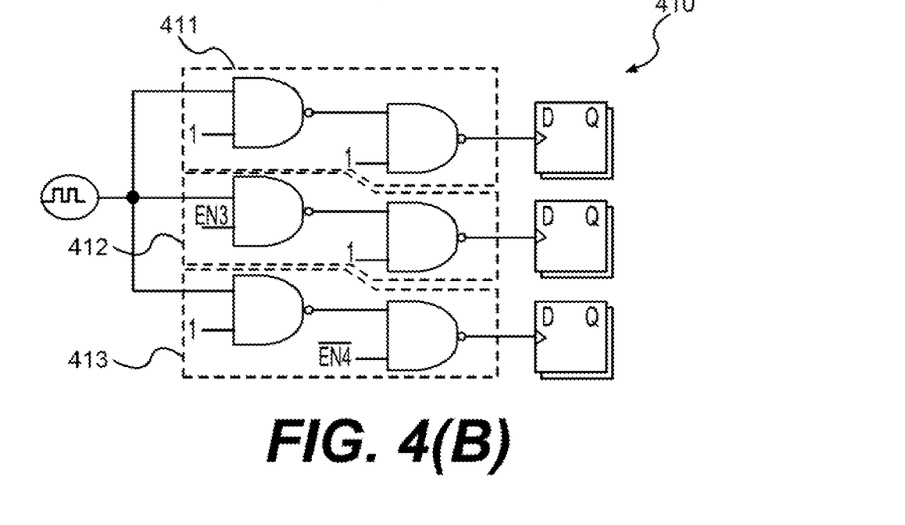
FIG. 4(b) is a diagram of an exemplary type-matched gated clock tree, synthesized in accordance with an embodiment of the present invention, with combinational logic equivalent to the conventional gated clock tree of FIG. 4(a).

In this scenario, a type-matched tree may be synthesized by transforming the logic gates in the level with NAND-gate equivalents. In some embodiments, therefore, NAND gates may be combined to function as NAND-gate equivalents, thereby implementing the logic of any other desired logic gate type. FIG. 4(b) depicts an exemplary type-matched equivalent gated clock tree 410 according to an embodiment of the present invention.

As shown in FIG. 4(b), type-matched tree 410 represents an equivalent to conventional gated clock tree 400, NAND gates 411 may be configured to function as a conventional clock buffer and replacement to buffer 401. NAND gates 412 may be configured to function as AND gate 402. And NAND gates 413 may be configured to function as OR gate 403. It should be noted that the illustrated NAND-gate equivalents are merely provided for the purposes of explanation. Those skilled in the art will recognize that other NAND-gate equivalents may be configured to correspond to other logic gate types. Accordingly, NAND-gate equivalents may be used to match the logic gates in a level in which the desired logic would conventionally require more than one type of non-buffer logic gate.

Figure 5:
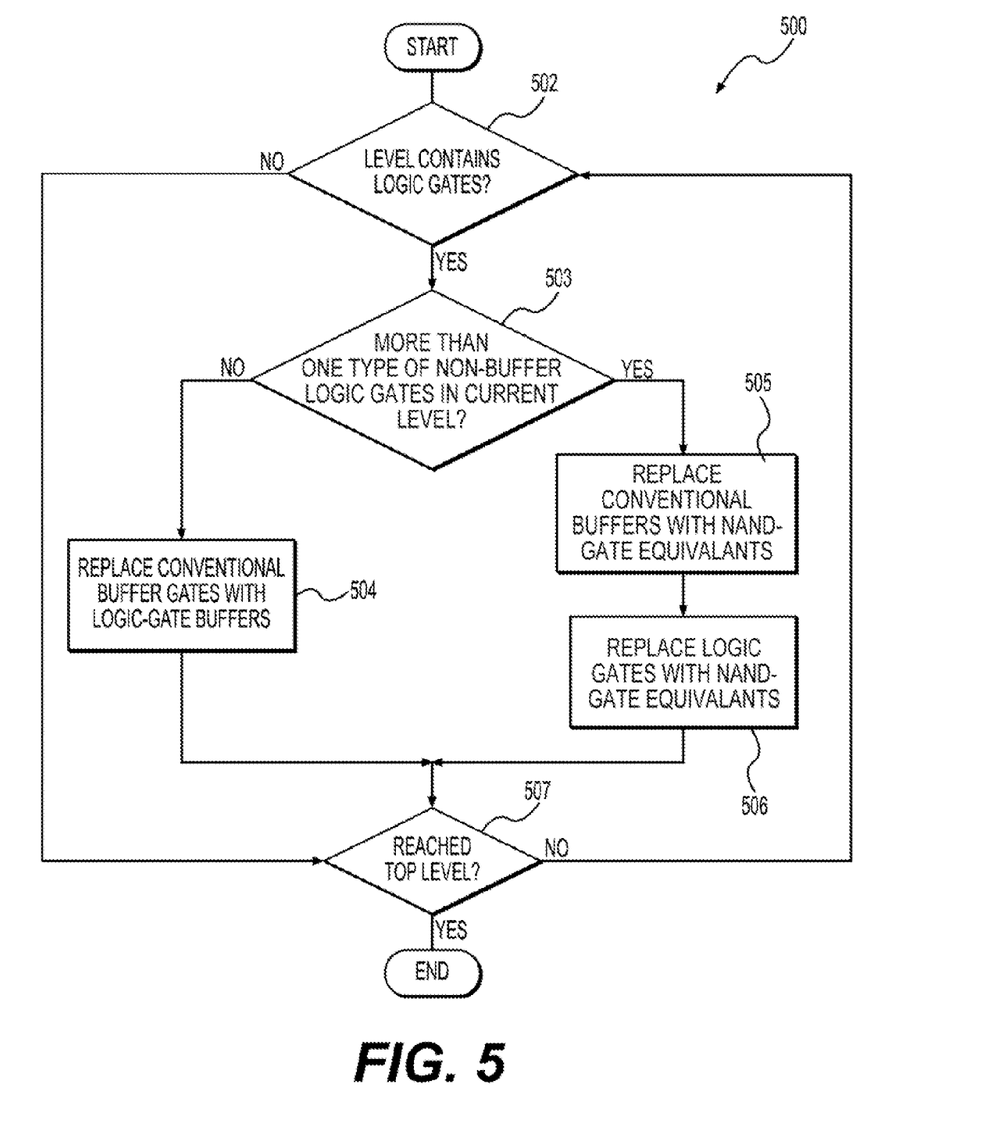
FIG. 5 is a flow diagram of an exemplary process for converting an existing gated clock tree into a type-matched clock gated tree, in accordance with an embodiment of the present invention.

In another embodiment, a process may be performed to convert a pre-existing gated clock tree into a logically equivalent type-matched gated clock tree. FIG. 5 illustrates an exemplary process for converting a pre-existing gated clock tree, such as a conventional unmatched gated tree, into a type-matched gated clock tree consistent with principles of the present invention. Process 500, shown in flowchart form, illustrates the steps that may be used to convert a pre-existing gated clock tree into a logically equivalent type-matched tree. Step 502 begins a process that proceeds in a bottom-up manner, i.e., beginning with the level closest to the state elements and moving upward, level-by-level, to the top level, the clock source. Other embodiments, however, may start at the level closet to the clock source. At step 502 it is determined whether the current level contains logic gates. If not, then no conversion in that level takes place. Otherwise, at step 503 is it determined whether the logic gates in the current level have more than one non-buffer logic types. If not, then at step 504 conventional buffer gates are replaced with logic-ate buffers of the same type as the non-buffer type logic gate(s) in the current level. If, on the other hand, there are more than one type of non-buffer logic gates in the current level, then each of the logic gates in the level are transformed into a NAND-gate equivalent. At step 505, conventional buffer gates, if any, are replaced with NAND-type buffer gates. Then, at step 506, all non-buffer type logic gates in the current level are replaced with their respective NAND-gate equivalents. Last, at step 507, it is determined whether the top level has been reached, which dictates whether the process ends or repeats for the next higher level.

Figure 6:
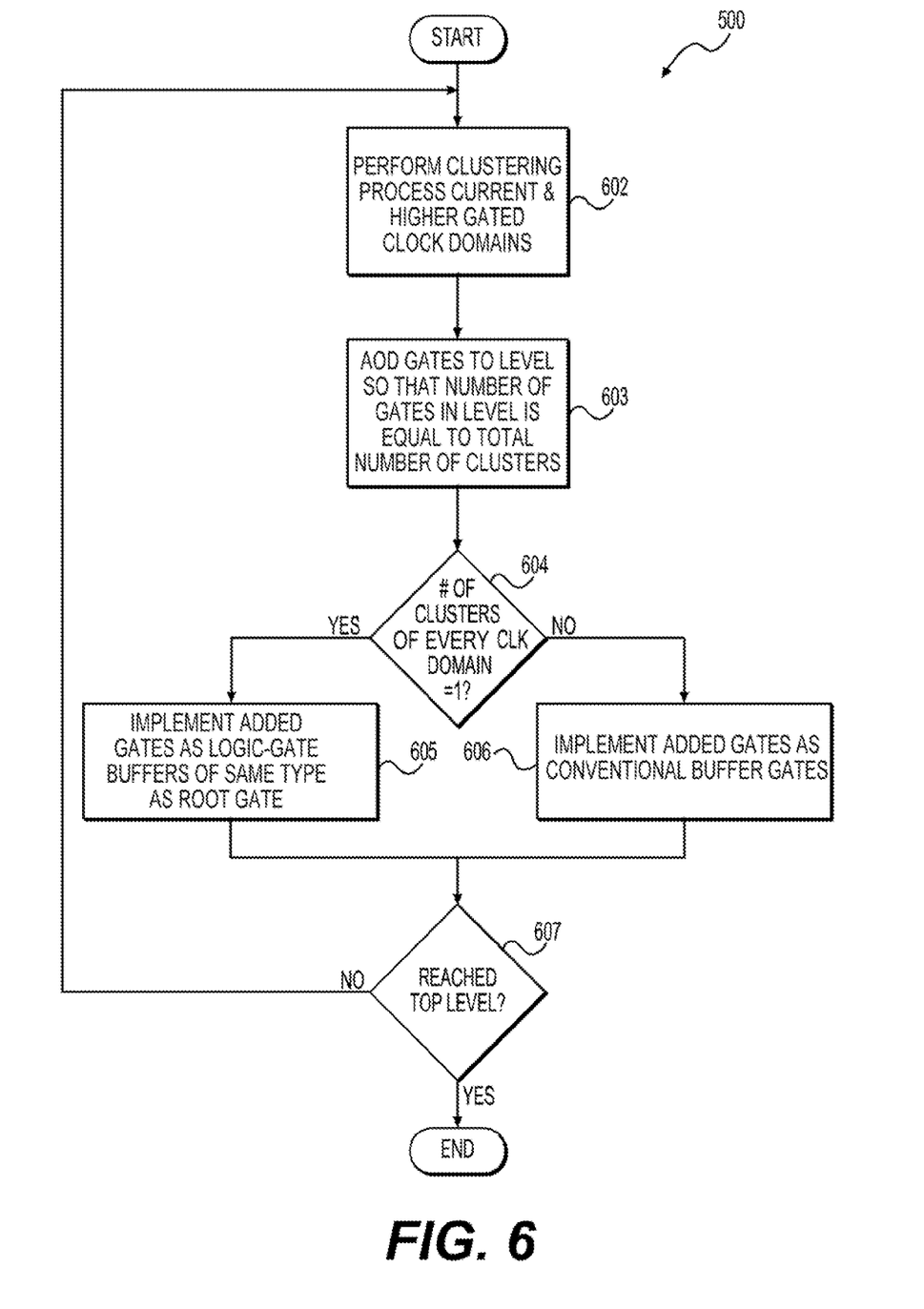
FIG. 6 is a flow diagram of an exemplary process for converting a pre-existing gated clock tree into a type-matched, load-matched gated clock tree, in accordance with an embodiment of the present invention.

In still another embodiment, clock skew may be further reduced by performing a type-matching, load-matching process, such as the exemplary process shown in FIG. 6. A pseudo-code implementation of this process is also described in the article Chang et al., "Type-Matching Clock Tree for Zero Skew Clock Gating, Design Automation Conference, 2008. 45th ACM/IEEE Volume, Issue, 8-13 Jun. 2008 pp. 714-719, which is incorporated herein by reference. In this aspect, a gated clock tree may be synthesized in which the logic gates at a level have a common logic type and drive a matching load. This exemplary embodiment assumes a pre-existing gated clock tree in which the pre-existing gates are type-matched consistent with principles of the present invention, such as, for example, by process 500. Accordingly, the process may serve to convert a pre-existing gated clock tree into a gated clock tree in which the logic gates in at least one level have a matching load and logic type.

Figure 7A:
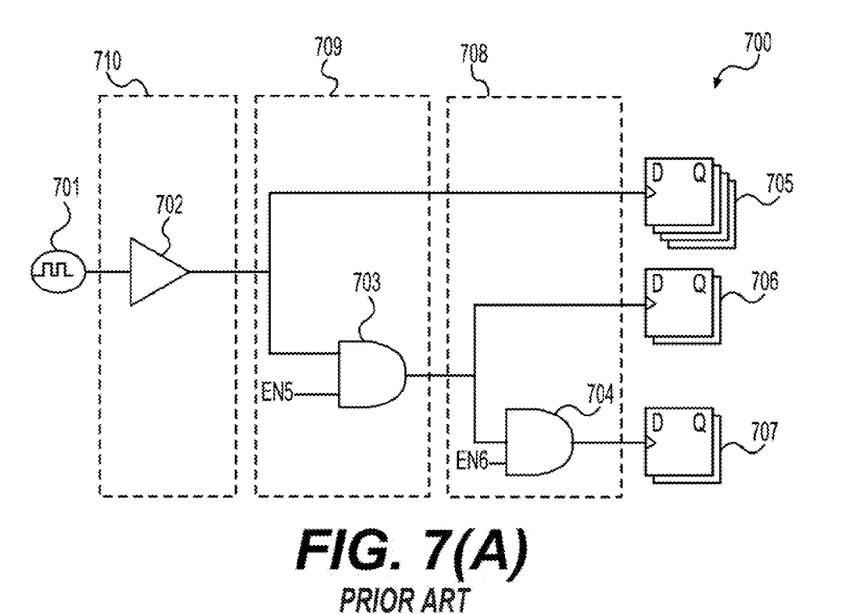
FIG. 7(a) Is a diagram of a conventional gated clock tree of the prior art.
Figure 7B:
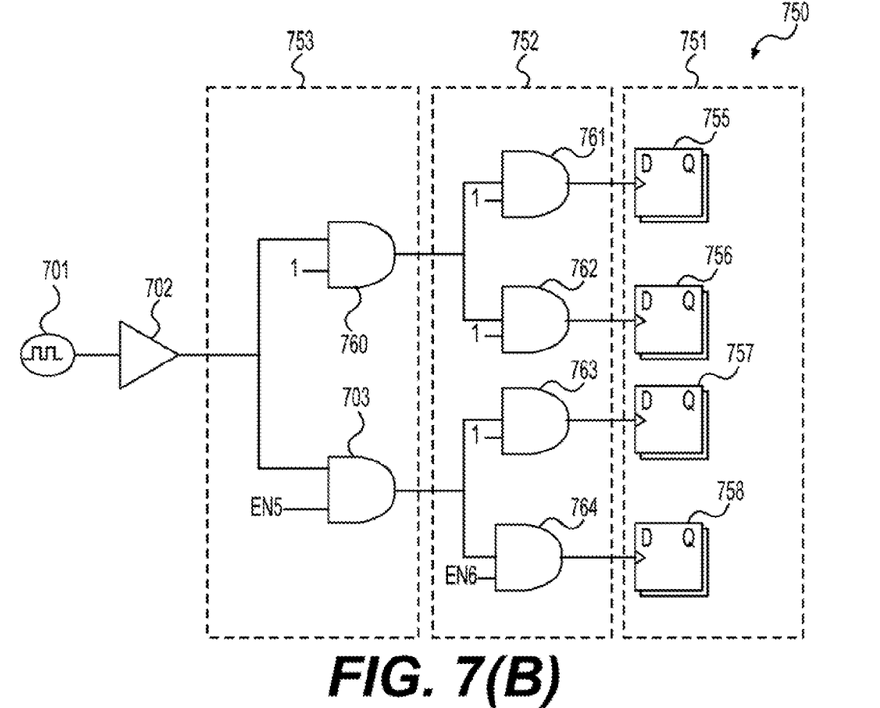
FIG. 7(b) is a diagram of an exemplary type-matched, load-matched gated clock tree, synthesized in accordance with an embodiment of the present invention, including combinational logic equivalent to the unmatched clock tree of FIG. 7(a).

For the purposes of explanation, reference will be made to the gated clock trees illustrated in FIGS. 7(*a*) and 7(*b*). FIG. 7(*a*) illustrates a pre-existing conventional gated clock 700 and FIG. 7(*b*) illustrates a corresponding type-matched, load-matched gated clock tree, synthesized in accordance with process 600. Conventional tree 700 has three gated clock domains: the first defined by clock buffer 702, a second defined by AND gate 703, and a third defined by AND gate 704. As illustrated, the load driven by the first clock domain (a set of four flip-flops 705) is not matched with the loads driven by the other clock domains (a pair of flip-flops 706 and 707, respectively, each in series with an AND gate). Conversely, corresponding type-matched, load-matched gated clock tree 750—has matched loads across each gated clock domain. For example, each of the logic gates in level 752 sees a pair of flip-flops.

Referring back to FIG. 6, exemplary process 600 operates in a bottom-up manner, synthesizing each level of the gated clock tree beginning with the level nearest the state elements and ending at the clock source. Beginning at step 60(2, a clustering process is performed on the gated clock domains of the current level and higher. As used herein, a clustering process refers generally to a statistical method for classifying and partitioning a data set into a set of subsets (i.e., clusters) according to some measure. In this case, for example, a given set of clock domains may represent the dataset, and the load in a given clock domain may represent the measure. One exemplary clustering process that may be used is described in A. D. Mehta, Y. P. Chen. N. Menezes, D. F. Wong, and L. T. Pileggi, "Clustering and Load Balancing for Buffered Clock Tree Synthesis," Proc. of IEEE/ACM International Conference on Computer Design, pp. 217-223, 1997. This clustering process determines an integer number of clusters for each gated clock domain. Next, at step 603, gates are added to the current level so that the total number of gates in the level equals the sum of the clusters determined at step 602.

Referring again to pre-existing conventional clock tree 700, the clustering process would be performed for each of the clock domains associated with buffer 702, AND gate 703, and AND gate 704. In this instance, the process could determine, for example, the number of clusters for these domains to be, 2, 1, and 1, thereby totaling 4 clusters. Accordingly, three gates in addition to the preexisting one (AND gate 704) should be added to the current level to meet the total of 4 determined by the clustering process.

At step 604, the number of clusters attributed to the current clock domain determines whether the gates added to the current level are implemented as conventional buffer gates or logic-gate buffers. If every clock domain at the current level has only one cluster, then, at step 605, the added gates are implemented as logic-gate buffers of the same type as the root gate. If any clock domain at the current level was determined to have more than one cluster, on the other hand, the added nodes are implemented with conventional buffer gates at step 606.

Referring again to the example clock trees of FIGS. 7(*a*) and 7(*b*), at step 604, the clock domain defined by the root node (AND gate 704) had 1 cluster. According to step 605, therefore, the additional three gates should be implemented as logic-gate buffers of the same type as AND gate 704. As a result, in the corresponding type-matched, load-matched tree 750, three additional gates are implemented as AND-type logic-gate buffers gates 761-763. At this point, the first level 708 of conventional tree 700 has been processed output tree 750 now contains four implemented nodes in first level 752.

At step 607 the process then determines whether the top level of the tree has been processed, i.e., whether the clock source has been reached. Returning again to conventional tree 700, the process would repeat for the next higher level, 709. At step 602, the clustering process would be performed on the current clock domain defined by AND gate 703 and the higher clock domain defined by clock buffer 702. Assuming for the purpose of explanation the clustering process determines one cluster for each clock domain, at a step 603 one node should be added to equal the total of two clusters. At step 604, it would then be determined that the current clock domain has only one cluster. Accordingly, the additional node would be implemented as an AND-type buffer gate at step 605 The resulting level of type-matched, load-matched tree 750 is level 753.

Process 600 repeats for the top level 710 of clock tree 700. Assuming the clustering process determines one cluster for the clock domain defined by buffer 702, then no gates need to be added at steps 603 and 605. Then, having reached the clock source at step 607, the process terminates.

In still another embodiment, a type-matched gated clock tree design may comprise both positive-edge triggered and negative-edge triggered state elements. Looking from the source of the clock tree, if the positive-edge triggered state elements and the negative-edge triggered state elements are triggered by the rising edge and the falling edge of the clock source, respectively, (or conversely, by the falling edge and the rising edge of the clock source, respectively), then, in general, clock skew effects are not a cause for concern because the duration of a half clock cycle between the rising edge and its adjacent failing edge is typically much longer than the clock skew. If on the other hand, the two types of state elements trigger on the same edge of the clock source, clock skew may need to be minimized. In such a gated clock tree with positive- and negative-edge-triggered state elements, we may refer to the combinational logic of the clock domain driving the positive-edge-triggered state elements as boolean expression "$f1$" and the combinational logic of the clock domain driving the negative-edge-triggered flip-flops as boolean expression "$f2$."

Figure 8:
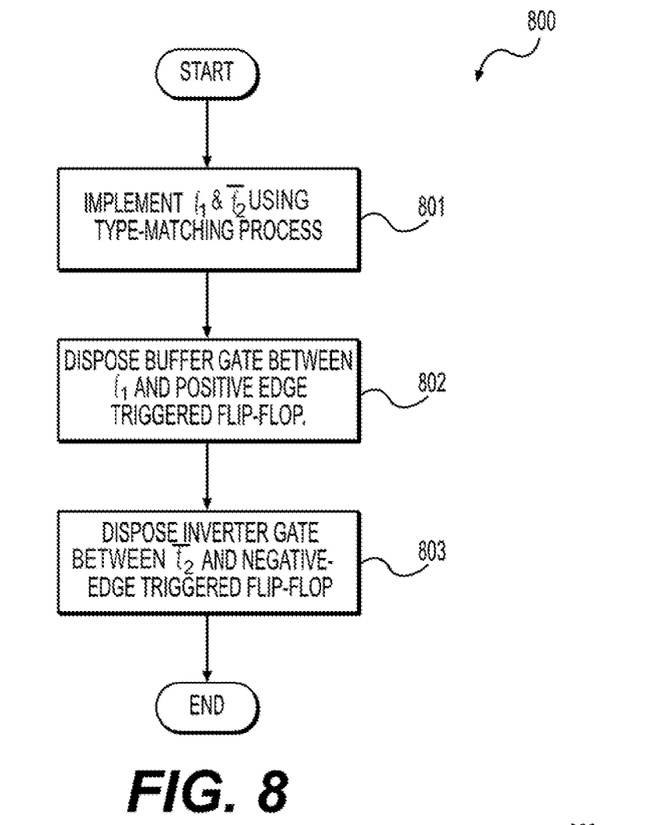
FIG. 8 is a flow diagram of an exemplary process for synthesizing a type-matched gated clock tree that includes positive- and negative-edge-triggered state elements, in accordance with an embodiment of the present invention.

FIG. 8 illustrates an exemplary process for synthesizing a type-matched gated clock tree that includes positive- and negative-edge-triggered state elements, in accordance with an embodiment of the present invention. Process 800 begins at step 801, in which the logic of $f1$ and $\overline{f2}$ (i.e., complement of $f2$), which are shown here as blocks, are implemented using a type-matching process consistent with other embodiments described herein. For example, $f1$ and $\overline{f2}$ may be implemented using type-matching and load-matching processes, 500 and 600, alone or in combination. Next, at step 802, one or more buffer gates (one for each set of positive-edge-triggered state elements) are disposed between the f1 and the positive-edge-triggered state elements. And at step 803, one or more inverter gates (one for each set of negativeedge-triggered state elements) are disposed between the $\overline{f2}$ and the negative-edge-triggered state elements. The gated clock tree synthesized according to this process therefore includes $f1$ and the complement of $f2$.

Figure 9:
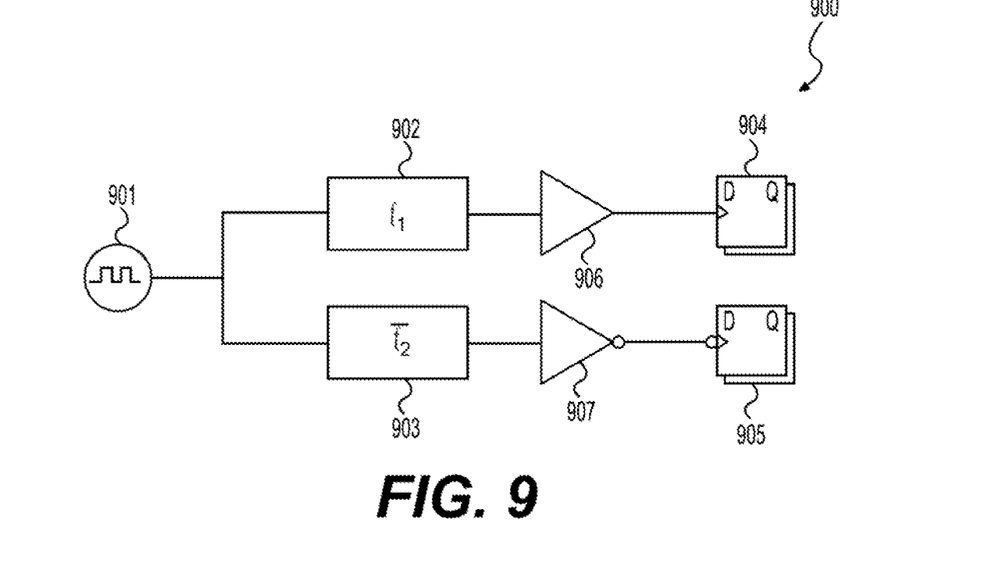
FIG. 9 is a diagram of an exemplary type-matched gated clock tree that includes positive- and negative-edge-triggered state elements, synthesized according to an embodiment of the present invention.

FIG. 9 illustrates an exemplary gated clock tree synthesized according to this embodiment. Gated clock tree 900 includes positive-edge-triggered flip-flop 904 and negative-edge-triggered flip flop 904, which receive distributed clock source 901 through combinational logic $f1$ and $\overline{f2}$, shown as blocks 902 and 903. Though not shown in detail, $f1$ and $\overline{f2}$ may be type-matched and for load-matched consistently with principles of the invention described herein Accordingly, one or more levels of combinational logic within blocks 902 and 903 may comprise logic gates that have a common logic type. As shown, buffer gate 906 is disposed between the f1 and the positive-edge-triggered flip-flop 904. And inverter gate 907 is disposed between the f2 and the pair negative-edge-triggered flip-flops 905. The resulting gated clock tree comprises $f1$ and the complement of $f2$. One should note that other embodiments may comprise more than two clock domains and, therefore, may have additional boolean functions that control additional state elements. Those skilled in the art will recognize, however, that the principles of the described embodiments may be extended to such designs while still failing within the scope of the present invention.

Moreover, it should be noted the above-described processes merely represent exemplary methods of synthesizing a type-matched and/or load-matched gated clock tree consistent with principles of the present invention. In particular, methods or systems that do not convert a pre-existing gated clock tree, but instead synthesize an original gated clock tree in accordance with the claims will also fail within the scope of the present invention. Furthermore, the processes described herein may be rearranged, combined, or preferred simultaneously.

Figure 10:
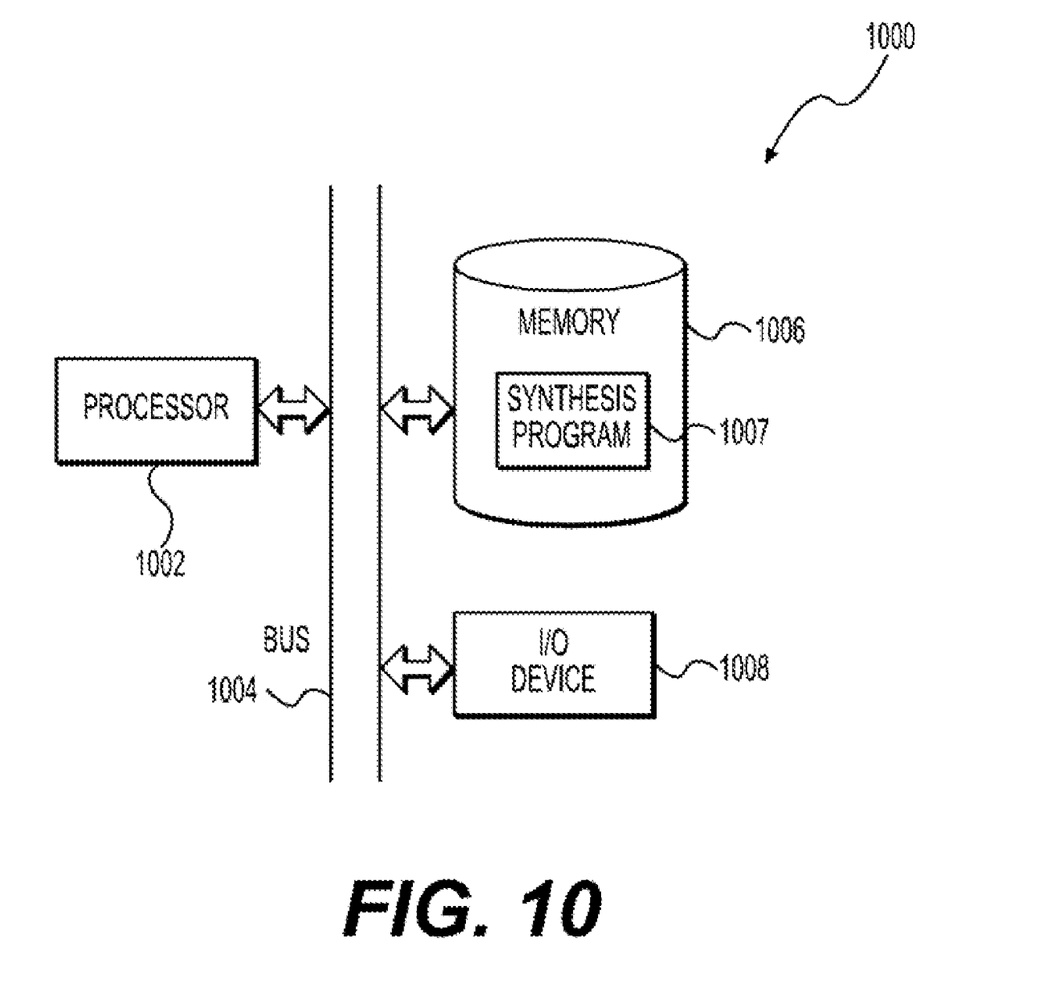
FIG. 10 illustrates an exemplary computer system in which an embodiment of the invention may be practiced.

In other embodiments, one or more processes may also be stored on a computer-readable medium that when read by a process may synthesize a type-matched and/or type-matched, load matched gated clock tree to reduce clock skew, according to the principles of the present invention. For example. FIG. 10 illustrates a computer system 1000 in which embodiments of the invention may be practiced. Computer system 1000 includes a processor 1002, a bus 1004, a memory 1006, and input device 1008.

Processor 1002 represents a processing unit, which may have any type of architecture, such as a CISC, RISC, VLIW, embedded processors, micro-controllers, or a hybrid architecture. Memory 1006 may store system code and data. It may also include program code or portions thereof for implementing embodiments consistent with the present invention. For example, memory 1006 may store a synthesis program 1007, which may be implemented as hardware, software, firmware, or the like. Synthesis program 1007 may represent program code to generate net lists, convert net lists, and/or transform gated clock tree circuits, etc., and that implements processes for synthesizing a gated clock tree according to principles of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for synthesizing a gated clock tree with reduced clock skew comprising the following computer-implemented stages:

providing a clock source operable to generate a clock signal;

providing a plurality of edge-triggered state elements;

providing a gated clock tree between the clock source and the plurality of edge-triggered state elements, wherein the gated clock tree comprises a level, wherein the level includes a plurality of logic gates; and matching, using a processor, the plurality of logic gates in the level such that each logic gate in the level has a common logic type.

2. The method of claim 1, wherein the matching further comprises configuring at least one of the plurality of logic gates as one of a logic-gate buffer and a NAND-gate equivalent.

3. The method of claim 2, wherein configuring the plurality of logic gates further comprises:

determining whether/the plurality of logic gates in the level have more than one type of non-buffer logic types; and transforming each of the plurality of logic gates into a NAND-gate equivalent if the plurality of logic gates in the level include more than one type of non-buffer logic types.

4. The method of claim 2, wherein configuring the plurality of logic gates further comprises:

determining whether the plurality of logic gates in the level have more than one type of non-buffer logic types; and transforming each of the plurality of logic gates that are buffer-type into logic-gate buffers if the plurality of logic gates includes only one type of non-buffer logic types.

5. The method of claim 1, wherein providing a gated clock tree further comprises converting a pre-existing gated clock tree into the gated clock tree.

6. The method of claim 1, further comprising configuring the gated clock tree such that each of the plurality of logic gates in the level has a matching load.

7. The method of claim 6, wherein configuring the gated clock tree further comprises:

performing a clustering process; and providing at least one additional logic gate to the level based on the clustering process.

8. The method of claim 7, wherein the method further comprises determining, by the clustering process, a sum of clusters and adding to the level a number of additional logic gates that equals the sum of clusters.

9. The method of claim 1, wherein providing a plurality of edge-triggered state elements further comprises providing at least one positive-edge-triggered state element and one negative-edge-triggered state element.

10. A non-transitory computer-readable storage medium comprising instructions that, when executed by a processor, performs a method comprising:

providing a clock source operable to generate a clock signal;

providing a plurality of edge-triggered state elements;

providing a gated clock tree between the clock source and the plurality of edge-triggered state elements, wherein the gated clock tree comprises a level, wherein the level includes a plurality of logic gates; and matching the plurality of logic gates in the level such that each logic gate in the level has a common logic type.

11. The computer-readable storage medium of claim 10, wherein the matching further comprises configuring at least one of the plurality of logic gates as one of a logic-gate buffer and a NAND-gate equivalent.

12. The computer-readable storage medium of claim 11, wherein matching the plurality of logic gates further comprises:
- determining whether the plurality of logic gates in the level have more than one type of non-buffer logic types; and
- transforming each of the plurality of logic gates into a NAND-gate equivalent if the plurality of logic gates in the level include more than one type of non-buffer logic types.

13. The computer-readable storage medium of claim 11, wherein matching the plurality of logic gates further comprises:
- determining whether the plurality of logic gates in the level have more than one type of non-buffer logic types; and
- transforming each of the plurality of logic gates that are buffer-type into logic-gate buffers if the plurality of logic gates in the level do not include more than one type of non-buffer logic types.

14. The computer-readable storage medium of claim 10, further comprising configuring the gated clock tree such that each of the plurality of logic gates in the level has a matching load.

15. The computer-readable storage medium of claim 14, wherein configuring the gated clock tree further comprises:
- performing a clustering process; and
- providing at least one additional logic gate to the level based on the clustering process.

16. The computer-readable storage medium of 15, further comprising determining, by the clustering process, a sum of clusters and adding to the level a number of additional gates that equals the sum of clusters.

17. The computer-readable storage medium of claim 10, wherein providing a plurality of edge-triggered state elements further comprises providing at least one positive-edge-triggered state element and one negative-edge-triggered state element.

18. A computer-implemented method for synthesizing a gated clock tree with reduced clock skew comprising the following computer-implemented stages:
- providing a clock source operable to generate a clock signal;
- providing a plurality of edge-triggered state elements;
- providing a gated clock tree between the clock source and the plurality of edge-triggered state elements, wherein the gated clock tree comprises a level, wherein the level includes a plurality of logic gates;
- matching, by a computer, the plurality of logic gates in the level such that each logic gate in the level has a common logic type, wherein matching the plurality of logic gates comprises:
  - determining whether the plurality of logic gates in the level have more than one type of non-buffer logic types; and
  - transforming each of the plurality of logic gates into a NAND-gate equivalent if the plurality of logic gates in the level include more than one type of non-buffer logic types.

* * * * *